United States Patent
Mason, Jr. et al.

[11] Patent Number: 6,100,817
[45] Date of Patent: Aug. 8, 2000

[54] FIXED NETWORK RF COMMUNICATIONS COMPLAINT WITH CEBUS PROTOCOL

[75] Inventors: Robert T. Mason, Jr.; Kenneth C. Shuey, both of Raleigh, N.C.

[73] Assignee: ABB Power T&D Company Inc., Raleigh, N.C.

[21] Appl. No.: 09/042,773

[22] Filed: Mar. 17, 1998

[51] Int. Cl.⁷ .................................................. G08B 23/00
[52] U.S. Cl. ................................ 340/870.02; 340/870.03; 340/870.07; 370/346
[58] Field of Search ...................... 340/870.02, 870.07, 340/870.03; 370/312, 328, 346

[56] References Cited

U.S. PATENT DOCUMENTS

| | | | |
|---|---|---|---|
| 3,973,240 | 8/1976 | Fong | 340/151 |
| 4,056,107 | 11/1977 | Todd et al. | 130/27 R |
| 4,190,800 | 2/1980 | Kelly, Jr. et al. | 325/37 |
| 4,250,489 | 2/1981 | Dudash et al. | 340/147 T |
| 4,321,582 | 3/1982 | Banghart | 340/310 R |
| 4,617,566 | 10/1986 | Diamond | 340/870.11 |
| 4,638,298 | 1/1987 | Spiro | 340/827 |
| 4,692,761 | 9/1987 | Robinton | 340/825.01 |
| 4,724,435 | 2/1988 | Moses et al. | 340/870.13 |
| 4,884,021 | 11/1989 | Hammond | 324/142 |
| 5,032,833 | 7/1991 | Laporte | 340/825.02 |
| 5,053,766 | 10/1991 | Ruiz-del-Portal et al. | 340/870.02 |
| 5,056,107 | 10/1991 | Johnson et al. | 375/1 |
| 5,179,376 | 1/1993 | Pomatto | 340/870.02 |
| 5,239,584 | 8/1993 | Hershey et al. | 380/28 |
| 5,345,225 | 9/1994 | Davis | 340/635 |
| 5,406,495 | 4/1995 | Hill | 364/483 |
| 5,438,329 | 8/1995 | Gastouniotis et al. | 340/870.02 |
| 5,473,322 | 12/1995 | Carney | 340/870.02 |
| 5,495,239 | 2/1996 | Ouellette | 340/870.02 |
| 5,544,036 | 8/1996 | Brown, Jr. et al. | 364/145 |
| 5,572,438 | 11/1996 | Ehlers et al. | 364/492 |
| 5,583,850 | 12/1996 | Snodgrass et al. | 370/346 |
| 5,621,629 | 4/1997 | Hemminger et al. | 363/56 |
| 5,696,695 | 12/1997 | Ehlers et al. | 364/492 |
| 5,986,574 | 12/1999 | Colton | 340/870.02 |

FOREIGN PATENT DOCUMENTS

| | | |
|---|---|---|
| 0395495 A1 | 10/1990 | European Pat. Off. . |
| 59-229949 | 12/1984 | Japan . |
| 5-260569 | 10/1993 | Japan . |
| 02222898 | 3/1990 | United Kingdom . |

*Primary Examiner*—Michael Horabik
*Assistant Examiner*—Timothy Edwards, Jr.
*Attorney, Agent, or Firm*—Woodcock Washburn Kurtz Mackiewicz & Norris LLP

[57] ABSTRACT

The CEBUS protocol is employed in an automatic meter reading (AMR) fixed network RF system while maintaining commonality and compliance with other CEBUS equipment. The AMR system comprises a plurality of utility meters, each meter comprising a radio frequency (RF) module for transmitting and receiving RF CEBUS message packets in accordance with a prescribed CEBUS protocol, wherein the CEBUS message packets contain embedded AMR message packets in accordance with a prescribed AMR protocol. In addition, the system includes a node(s) for accessing data stored by any one or a group of the utility meters via RF communications using the CEBUS protocol.

50 Claims, 3 Drawing Sheets

FIXED NETWORK RF COMMUNICATIONS COMPLAINT WITH CEBUS PROTOCOL

FIELD OF THE INVENTION

The present invention relates generally to an automatic meter reading (AMR) system with CEBUS capabilities.

BACKGROUND OF THE INVETION

The present invention provides a method and system by which a fixed network radio frequency (RF) communication system is made compliant with the standard CEBus protocol, and to an AMR network comprising concentrator nodes and end meters that are able to utilize the CEBus RF physical layer and protocol while co-existing with other CEBus RF devices that are, or might be, deployed in the proximity of the AMR network. Accordingly, the background information provided below relates specifically to CEBus and AMR systems.

Automatic Meter Reading

The reading of electrical energy, water flow and gas usage has historically been accomplished with meter readers that came on-site and manually documented the readings. Over time, this manual methodology has been enhanced with walk by or drive by meter reading systems that utilize radio communications to and from the person or vehicle. Moreover, in the last few years, there has been a concerted effort to accomplish meter reading by installing fixed communication networks that permit data to flow from the meter to a host computer system without human intervention. These systems have typically been proprietary by design and consequently prevent customers from having dual sources of supply and access to other functions available from the RF technology.

Several fixed network communication systems exist in the market that use proprietary architectures, modulation techniques and/or frequency spectra. Companies such as Cellnet Data Systems, San Carlos, Calif., and Itron, Inc., Spokane, Wash., manufacture two such systems. Utilities that purchase these systems do not have the capability to add functionality to the systems unless they purchase the products from the originator of the technology. The result of this is a reluctance of most utilities to employ large scale AMR systems.

CEBUS

The industry standard CEBUS (Consumer Electronics Bus) protocol (EIA IS-60) was adopted by the Electronics Industries Association (EIA). It relates to a local area network that uses multiple media, including power line, radio, twisted pair, coaxial cable, and infrared signaling, and provides reliable communications within a single residence over one or more physical media. Typically, the products using CEBUS equipment (e.g., the ABB Power T&D Company TranstexT system) have attempted to accomplish home automation tasks such as real time pricing and demand side management. CEBUS power line has typically been the media of choice for these applications.

Copending U.S. patent application Ser. No. 08/828,539, filed Mar. 31, 1997, and titled "Communications Module Based Repeater," discloses a reliable, low cost communications module that is configurable for use in a number of modes in accordance with its location in a CEBUS network. The disclosed modes of operation include a source/interface mode in which the module serves as an interface between a host application and the network, a repeater mode in which the module receives and re-transmits message packets originated by another device and intended for a destination device, and a standalone device mode in which the module serves as a destination device for receiving messages from other devices.

Further background information may be found in U.S. Pat. No. 5,696,695, Dec. 9, 1997, titled "System for Rate-Related Control of Electrical Loads." This patent discloses a system that attempts to cover residential applications of a variety of demand side management features. These features may be initiated at a host site and transmitted to a residence or could be accomplished locally. Communications are transmitted to devices in the home using CEBUS power line or RF technology. This system employs the generic CEBUS protocol as specified in the EIA documentation. The disclosed system, therefore, is an example of a system that could be installed at a residence prior to installation of an AMR network that utilizes CEBUS RF in the manner disclosed herein.

Thus, a system could be installed at a residence to handle several loads within the home, shifting power usage to match the pricing structure programmed into the electric meter. The information in the meter can be extracted using CEBUS powerline or RF by a controller in the home that makes decisions based on the metering data and other critical inputs. The present invention particularly addresses the challenge of providing an AMR system using CEBUS RF without preventing the installed residential CEBUS system from working.

SUMMARY OF THE INVENTION

The present invention, therefore, concerns the compatibility between an AMR network and a CEBUS RF system. Briefly, the invention teaches that the aforementioned compatibility may be achieved by embedding the AMR protocol within the CEBUS protocol. This technique keeps the collision avoidance algorithms and peer to peer communications, elements that are an integral part of CEBUS, intact while offering a method and system to read many meters.

In sum, the present invention provides a method and system by which the CEBUS protocol can be utilized in an AMR fixed network RF system while maintaining commonality and compliance with other CEBUS equipment. An AMR system in accordance with the present invention comprises a plurality of utility meters, each meter comprising a radio frequency (RF) module for transmitting and receiving RF CEBUS message packets in accordance with a prescribed CEBUS protocol, wherein the CEBUS message packets contain embedded AMR message packets in accordance with a prescribed AMR protocol; and a node for accessing data stored by any one or a group of the utility meters via RF communications using the CEBUS protocol.

In the preferred embodiments of the invention, the CEBUS message packets provide fields for addressing individual meters and groups of meters, for performing multi-level repeater functions, and for performing authentication/password control. Specifically, the CEBUS protocol comprises a Source Device Address field and an Information field that includes a Network Layer Header (NPDU), an Application Layer Header (APDU), and a Common Application Language (CAL) message; and repeater information is embedded in the Source Device Address field, authentication/password information is embedded in the Application Layer Header, and group addressing information is embedded in the Common Application Language message.

In the preferred embodiments, the CAL message includes a user defined header portion having a format including a Group Response Select field, an Address Mask field, and art Address field. The CAL message format may consist of bit fields having the following configuration:

Group Response Select Address Mask Address Field

| Group Response Select | Address Mask | Address Field |
| --- | --- | --- |
| 4 bits | 4 bits | 32 bits |

Each meter preferably has a unique address and the node is preferably capable of reading data of individual meters using the individual meters' unique address. Moreover, the node is also preferably capable of reading data of a selected group of meters with a single command.

In the preferred embodiments of the invention, the Address Mask field has a first prescribed format for messages from the node to the meters and a second prescribed format for messages from the meters to the node. For messages sent from the node to a meter(s), the Address Mask field identifies the type of address held in the Address field. When the Address Mask equals zero, the Address field contains a unique address; and when the Address Mask field is non-zero, the Address field is divided into a prescribed number of group addresses and each of the bits in the Address Mask field are used to indicate the presence or absence of a specific group address.

In the preferred embodiments, if an address select bit in the Address Mask field is set (=1), the meter will respond only if a corresponding address in the Address field matches the meter's address.

For group addressing, the format of the Address Mask and Address fields may comprise bit fields having the following format:

| Address Mask Field | | | | Address Field | | | |
| --- | --- | --- | --- | --- | --- | --- | --- |
| Utility Select | Section Select | Class Select | Division Select | Utility Address | Section Address | Class Address | Division Address |
| 1 bit | 1 bit | 1 bit | 1 bit | 12 bits | 4 bits | 8 bits | 8 bits |

In the preferred embodiments of the invention, each response message from a meter contains the meter's unique address, and the Address Mask field is defined differently for meter response messages. For meter response messages, the bits of the Address Mask field are used by meters functioning as repeaters to indicate message transfer failure. For meter response messages, the Address Mask field may be defined as:

| Address Mask in response message | Definition |
| --- | --- |
| 0 | No errors, successful message |
| 1 | 1st level repeater did not receive response from repeater or end meter |
| 2 | 2nd level repeater did not receive response from end meter |
| 3–15 | undefined |

For group response messages in the preferred embodiments, the node is capable of eliciting individual responses from a selected group of meters by broadcasting a single command. Moreover, after broadcasting a message, the node sets a timer and waits for meter responses before it broadcasts another message; and each meter is assigned a unique window of time during which it is allowed to broadcast a response to the node. Further, in the preferred embodiments, the window of time comprises two configurable parameters, including a timeslot parameter and a window size parameter. No two meters responding to a message from the node are configured with the same timeslot but all meters responding to the message are configured with the same window size.

Further still, in the presently preferred embodiments, the Group Response Select field allows the node to select one of a prescribed number of meter timeslots for the group response. In addition, each meter has an associated application and, after a given meter receives a node message and is waiting to transmit its response, the given meter uses a Link layer filter to prevent responses to the node from other meters from being passed to the given meter's application. The given meter's application is thereby prevented from continually reading and processing received messages while waiting to transmit a response.

The Source Address field is preferably used for repeater addresses to either implement RF communications that read meters directly, with single repeats or with dual repeats.

In addition, to prevent unauthorized access to the meters, an encrypted password algorithm is used at the meter and at the node. The encryption algorithm may be time dependent such that an encryption key employed by the algorithm is changed periodically. The node will preferably follow the same encryption algorithm as the meters such that the encryption key will be known by both the node and the meters, and time synch messages from the node may be employed to ensure that both the node and the meters maintain the correct sequence in changing the encryption key.

Another aspect of the present invention provides a method for operating an AMR system. According to the inventive method, fields are defined in CEBUS message packets so as to provide fields for addressing individual meters and groups of meters.

Other features of the present invention are disclosed below.

DETAILED DESCRIPTION OF PREFERRED EMBODIMENTS

This disclosure provides a method by which the CEBUS protocol can be utilized in a AMR fixed network RF system while maintaining commonality and compliance with other CEBUS equipment. The system concept teaches that different layers of the network functionality are embedded into the basic format of the CEBUS protocol, as shown below.

Figure 1:
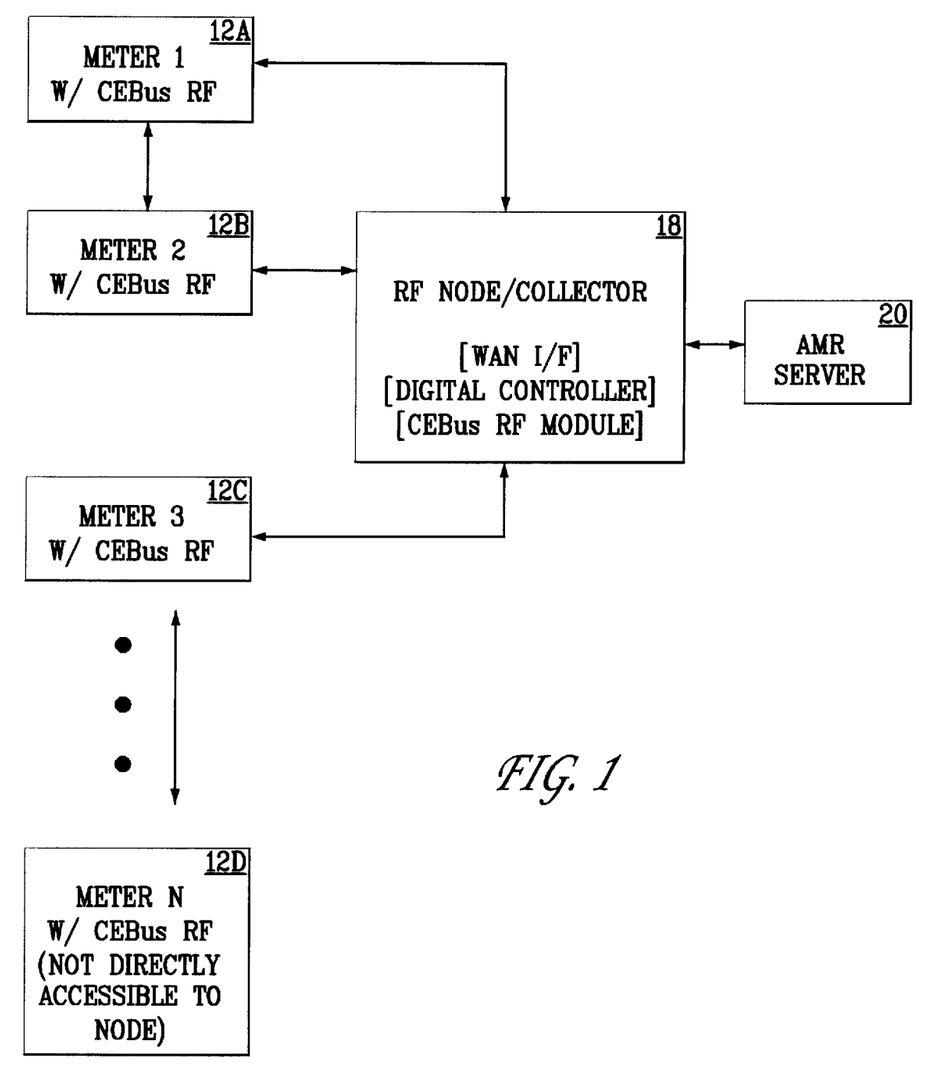
FIG. 1 is a simplified block diagram of an AMR system in accordance with the present invention.

FIG. 1 depicts an AMR system comprising, in accordance with the present invention, a plurality of utility meters 12A, 12B, 12C, . . . 12D (for metering electricity, gas or water). Each of the meters has a corresponding CEBUS RF module for receiving RF communications from a node, or collector, 18, or sending RF communications to the node, and also for communication with a CEBUS local area network (LAN) within the residence or business with which the meter is associated. The node 18 preferably includes a wide area network (WAN) interface, a digital controller, and a CEBUS RF module. The WAN interface, digital controller, and CEBUS RF module are not described in detail herein since such devices are well known in the networking and communications fields.

Figure 2:
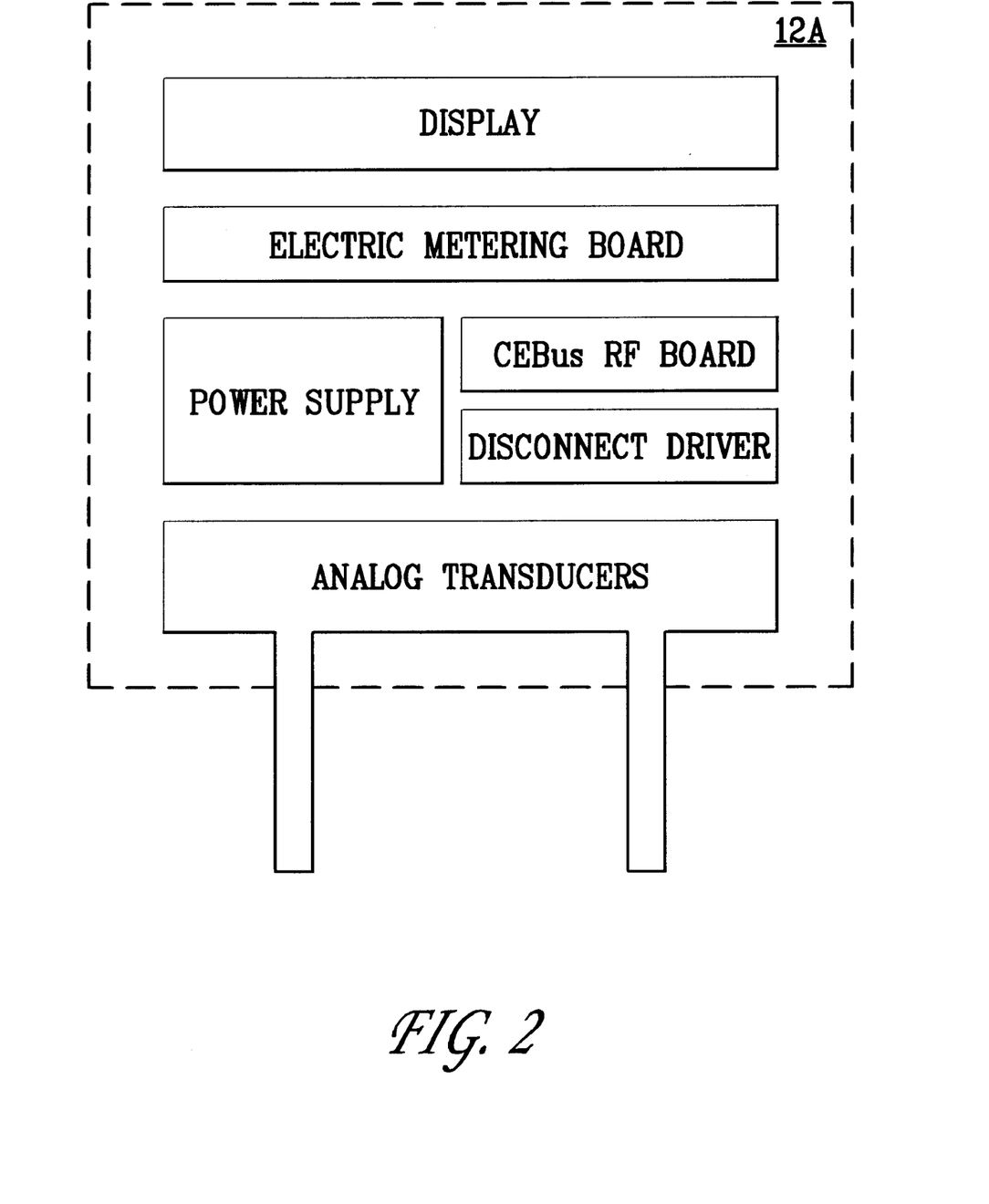
FIG. 2 is a more detailed diagram of a utility meter in accordance with the present invention.

FIG. 2 is a more detailed block diagram of a utility meter such as meter 12A. A s shown, the exemplary meter 12A includes a display, a metering board (e.g., including analog to digital convertors, a digital signal processor, etc., for performing the metering function), a power supply, a CEBUS RF board, a disconnect switch drive circuit, and a set of analog transducers. Again, such utility meters are well known and therefore will not be described in detail here, particularly since the present invention does not require any specific design for the meters.

Figure 3:
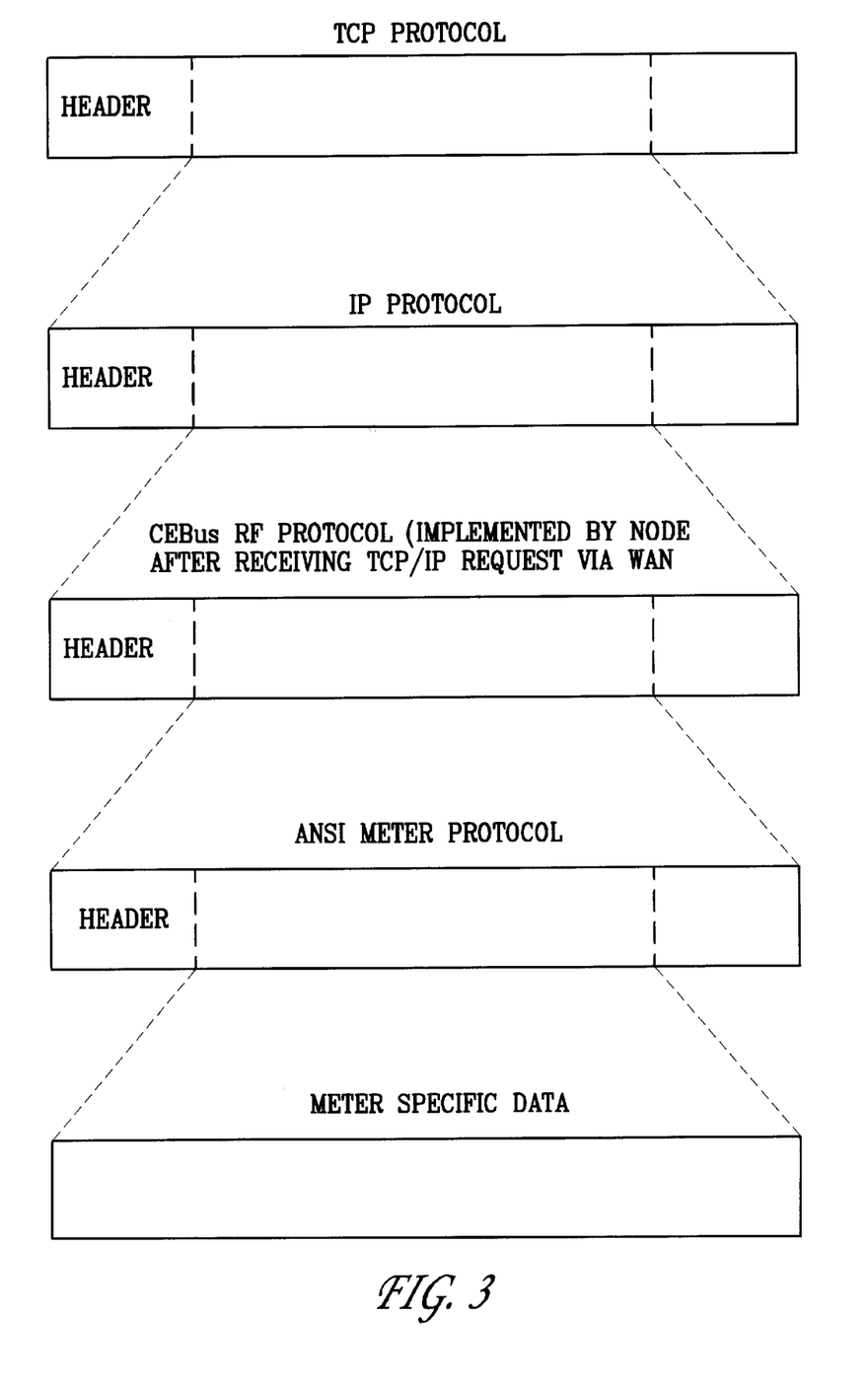
FIG. 3 schematically illustrates a communications protocol in accordance with the present invention.

FIG. 3 schematically illustrates a communications protocol in accordance with the present invention. This protocol is explained in greater detail below. However, it may be briefly summarized as entailing the use of the TCP and IP protocols for communications among the server 20 (FIG. 1) and the node/collector units 18 (only one is shown in FIG. 1). In addition, the inventive protocol employs the CEBUS RF protocol, which is implemented by the node after receiving a request over the WAN. The CEBUS packet contains a packet in accordance with the ANSI meter protocol, and that packet in turn contains the specific data for a given meter or meters.

Copending U.S. patent application Ser. No. 08/870,640, filed Jun. 6, 1997, entitled "RF Repeater for Automatic Meter Reading System," and U.S. patent application Ser. No. 08/908,728, filed Aug. 7, 1997, entitled "Energy Meter with Multiple Protocols for Communication with Local and Wide Area Networks" disclose related inventions concerning the use of fixed RF networks for AMR applications with utility meters having CEBUS capabilities. For example, the '640 application teaches a way to make the RF system adaptive to read hard to access meters within the network, by permitting any meter in the network to operate as a repeater. Thus, referring to FIG. 1, meter 12D may be considered "inaccessible" with respect to the responsible node 18. The node 18, which is coupled to the AMR server 20 by a telephone link or some other wired or wireless link, sends information to the AMR node 18, which then directs the information to the "inaccessible" meter 12D by routing it through, say, meter 12C, which in this example function as a repeater. Thus, the cited copending applications may be consulted for further information concerning practical systems of the kind for which the present invention is particularly suited.

The present invention will now be described in greater detail. In the following discussion, the basic CEBUS protocol is described first, and then the enhancements for fixed network AMR are described.

1. The Basic CEBUS Protocol

| CEBUS Frame | | | | | | | |
|---|---|---|---|---|---|---|---|
| Preamble | Control | Destination Address | Destination House Code | Source Address | Source House Code | Information Field | Chksum |
| 8 bits | 8 bits | 16 bits | 16 bits | 16 bits | 16 bits | 32 bytes | 8 bits |

| 1.1 Control Field The 8-bit control field is defined as follows: | | | | | | | |
|---|---|---|---|---|---|---|---|
| 7 | 6 | 5 | 4 | 3 | 2 | 1 | 0 |
| Seq Number x | Service Class 0 | Rsvrd 0 | Priority 0 | 0 | 0 | Packet Type 1 | 0 |
| Seq Number | Toggled for each new packet transmitted by a device | | | | | | |
| Service Class | Only Basic Service, '0', is supported. | | | | | | |

-continued

| | |
|---|---|
| Rsvrd | Reserved field, set = '0' |
| Priority | 00 = High, 01 = Standard, 10 = Deferred, 11 = Undefined |
| | Fixed network will only use high priority packets |
| Packet Type | 000 = IACK |
| | 001 = ACK_DATA |
| | 010 = UNACK_DATA |
| | 011 = undefined |
| | 100 = FAILURE |
| | 101 = ADR_ACK_DATA |
| | 110 = ADR_IACK |
| | 111 = ADR_UNACK_DATA |

In a preferred embodiment of the present invention, packets in the fixed network are to be broadcast using the UNACK_DATA packet type.

1.2 Destination and Source Address Fields

In the presently preferred embodiment of the subject invention, the Source House Code is used to specify the ID of the concentrator node. Meters will typically only respond to messages which are from their assigned node. Moreover, all packets will be broadcast, and will therefore contain NULL Destination House Code and Destination Address fields. The Source Address field will be used to hold 2 bytes (16 bits) of repeater information. When the Source Address field is 0, the packet is delivered directly from the concentrator node to the meter. If the Source Address field is non-zero, repeaters are being used to transfer the packet between the node and the end meter.

The address fields used by the AMR system are buried in the CAL User Defined Message in the information field. This is discussed below in section 1.3.3.

The meter can be used to communicate to CEBUS devices that are not part of the fixed network, but would be considered part of a residential LAN. For LAN functionality, the meters are assigned an Address and a House Code, and communicate to one device at a time using packet types ACK_DATA and IACK. The majority of LAN communication packets will be point to point, with the Destination Address fields containing the address of one destination device. However, it is possible for LAN devices to broadcast messages. To differentiate between broadcast packets from the node and LAN broadcast packets, LAN broadcast packets will always include a Destination House Code which matches the Source House Code. This difference in broadcast packets provides a mechanism for the meters to distinguish between a broadcast packet from the node which is to be repeated, and a LAN broadcast packet which is intended for devices within a single House Code.

1.3 Information Field

The Information field includes a NPDU header (Network layer header), an APDU header (Application layer header) and a CAL message.

1.3.1 NPDU Header

The NPDU headers required for the fixed network system are 1–3 bytes in length. If a message does not fit into the 32 byte Information field, the message is segmented into multiple packets. A segmented message requires a 3 byte NPDU header. Messages fitting into the 32 byte Information field only require a 1 byte NPDU header. The 3-byte NPDU header has the following format:

In the preferred embodiment of the present invention, the NPDU fields used for the fixed network are defined as:

| Byte # | 7 | 6 | 5 | 4 | 3 | 2 | 1 | 0 |
|---|---|---|---|---|---|---|---|---|
| 1 | PR | Routing Type | | PAC | EXT | AM | BR2 | BR1 |
| | 0 | 1 | 0 | x | x | 0 | 0 | 0 |
| 2 | Packet Usage Type | | | | M | FC | FC Window Size | |
| | 1 | 1 | 0 | 0 | x | 0 | 1 | |
| | | | | | | | 1 | |
| 3 | Sequence Number | | | | | | | |

Byte #1

| | |
|---|---|
| PR | Indicates privilege of the NPDU. 0 = unprivileged. |
| Routing Type | Specifies how the message will be routed through the CEBUS network. Directory route (%10) is the only type supported for the fixed network system. |
| PAC | Set = 1 if this packet (frame) is the first packet of a message. |
| EXT | Set = 1 if the NPDU consists of more than one byte |
| AM | Allowed media. '0' indicates that no other media are allowed for message transfer. |
| BR2, BR1 | Brouter identification subfields. %00 indicates brouters are not supported. |

Byte #2

| | |
|---|---|
| Packet Usage Type | Defines the multi-byte NPDU header. The only type supported for the fixed network system will be SEG_SERVICE (%1100) |
| M | Toggled for each new message transmitted by a device |
| FC | Flow Control enable. '0' disables flow control |
| FC Window Size | When FC is enabled, this field specifies the FC window size. The window size is 2+ this field. Window range is 2–5 packets. When FC is disabled, this field is set to %11. |

Byte #3

| | |
|---|---|
| Sequence Number | Count down sequence number for the message. The sequence number of the last packet is 0. |

1.3.2 APDU Header

In the preferred embodiment of the invention, the two types or modes of APDU headers that are to be supported are Fixed (Mode=1) and Variable (Mode=0). Fixed mode APDUs are used for messages that do not require authentication or password information for the end device to act on the message. Variable mode APDUs are used for messages that require authentication or password information. The formats of the two headers are summarized below:

1.3.2.1 Basic Fixed APDU header

| Byte # | 7 | 6 | 5 | 4 | 3 | 2 | 1 | 0 |
|---|---|---|---|---|---|---|---|---|
| 1 | reserved | Mode | APDU Type | | | Invoke ID | | |
| | 1 | 1 | | | | | | |

| Supported Basic Fixed APDUs | | |
|---|---|---|
| APDU Type ID | APDU Type Name | Description |
| 100 | Implicit Invoke | All messages which do not require authentication/password information |

1.3.2.2 Basic Variable APDU header

| Byte # | 7 | 6 | 5 | 4 | 3 | 2 | 1 | 0 |
|---|---|---|---|---|---|---|---|---|
| 1 | reserved | Mode | ENC | | APDU Type | | | |
| | 1 | 0 | 1 | | | | | |
| 2 | Authentication Algorithm ID | | | | Invoke ID | | | |
| | 1 | 0 | 1 | 0 | 1 | 0 | 0 | 0 |
| 3–6 | Authentication/Password Information | | | | | | | |

| Supported Basic Variable APDUs | | |
|---|---|---|
| APDU Type ID | APDU Type Name | Description |
| 10100 | Auth. Implicit Invoke | Authenticated invoke. All non-response messages which require authentication/password information |

(Authentication/Password information is discussed in detail in below.)

Note that for the fixed network AMR system, no response APDU packet types are used. All packets are broadcast and are therefore invoke APDUs. The command/response format typically used for meter communications is buried in the CAL User Defined Message field, and will adhere to the ANSI C12.18 standard protocol for meter communications.

1.3.3 CAL Message

The Common Application Language (CAL) is the language or protocol by which CEBUS devices communicate. It is an object oriented type of language, which divides device functionality into Objects within a Context. A Context may be thought of as a higher grouping of device functionality.

All CEBUS compliant devices support the Node Control and Context Control Objects in the Universal Context. The meters will support the required objects in the Universal Context The other Context supported by meters in the fixed network system is the Utility Meter Context (Context ID $50). Within this context, the meter supports the Context Control Object and a User Defined message. The main objective of the fixed network system is to read meter information. ANSI standard C 12.19 defines the data structures or tables for metering devices. ANSI standard C12.18 defines the protocol used to transfer these tables. To minimize the number of communication interfaces to a meter, the application layer of the C12.18 protocol is passed in a CEBUS CAL message using the Utility Meter Context and the CAL User Defined Message Structure.

CAL User Defined message format and fixed network implementation:

| <Context ID> | <DATA Token> | <Message Length> | <ESCAPE Token> | <User Defined Data> | |
|---|---|---|---|---|---|
| $50 | $F4 | ASCII length | $F6 | User defined header | C12.18 application layer command |

CAL response message format and fixed network implementation:

| <Context ID> | <DATA Token> | <Message Length> | <ESCAPE Token> | <User Defined Data> | |
|---|---|---|---|---|---|
| $50 | $F4 | ASCII length | $F6 | User defined header | C12.18 application layer response |

2. Further Network Enhancements for Fixed Network AMR

Three requirements of a fixed network CEBUS system deserve special attention: meter addressing, multi-level repeater support and authentication/password control. The Source Device Address is used for repeater information, the authentication/password information is handled in the CEBUS APDU header, and the group addressing information is embedded in the user defined header portion of the CAL message.

| Group Resp Select | Address Mask | Address Field |
|---|---|---|
| 4 bits | 4 bits | 32 bits |

2.1 Addressing

The node or data concentrator in a fixed network system must be able to read individual meters using the meter's unique address, but more importantly, must be able to read a group of meters with only one command. The Address Mask and Address fields are used to handle both the command and response address format. The definition and format of the Address Mask field depends on the message direction.

For messages sent from the node to the meter, the Address Mask field specifies the type of address held in the Address field. When the Address Mask=0, the Address field contains a 32 bit unique address. When the Address Mask field is non-zero, the Address field is broken into 4 group addresses, and each of the 4 bits in the Address Mask field are used to indicate the presence (bit set=1) of the specific group address. In other words, if the address select bit in the Address Mask field is set, the corresponding address in the address field must match the meter's address for the meter to respond to the message. For group addressing, the format of the Address Mask and

| Address Mask Field | | | | Address Field | | | |
|---|---|---|---|---|---|---|---|
| Utility Select | Section Select | Class Select | Division Select | Utility Address | Section Address | Class Address | Division Address |
| 1 bit | 1 bit | 1 bit | 1 bit | 12 bits | 4 bits | 8 bits | 8 bits |

Meter responses always contain the meter's unique address, so the Address Mask field is defined differently for meter response messages. In responses, the 4 bits are used by repeaters to indicate message transfer failure, and the Address Mask field is defined as

| Address Mask Field in response msg | Definition |
|---|---|
| 0 | No errors, successful message |
| 1 | 1st level repeater did not receive response from repeater or end meter |
| 2 | 2nd level repeater did not receive response from end meter |
| 3–15 | undefined |

2.2 Group Responses

CEBUS broadcast messages do not generate responses from the receiving devices. To utilize the communication bandwidth most efficiently, a fixed network needs to issue a single command to a group of meters and get individual responses from each meter. Application layer timing at the node and meters will provide a mechanism for command/multiple response messaging.

After broadcasting a message, the node will set a timer and wait for meter responses before it is allowed to broadcast another message. So that all meters that are part of the node cell can synchronize to the node message, the node packet is transmitted one time with no Link layer retries. Each meter is assigned a unique window during which it is allowed to broadcast a response to the node. The meter window consists of two configurable parameters: timeslot (0-x), and window size (yy msec). No two meters responding to a node message may have the same timeslot. All meters responding to a node message should be configured with the same window size. The window size accounts for the time required for a meter to access the CEBUS channel and transmit a packet. A configurable window size allows for one or more data link retries for each meter packet. Data thru-put for group response messages is examined below.

The 4 bit Group Response Select field allows the node to select 1 of 16 meter timeslots for the group response. If 512 meters exist in one node cell, meters can be instructed to use one timeslot when all 512 meters respond and a different timeslot when a subset of meters are selected to respond. For example, if the node only needs to read a group of 10 meters, the meter timeslots could be set to 1–10 instead of spread out from 1–512.

A potential problem arises when CEBUS devices that are not a part of the fixed network co-exist with the devices that are part of the fixed network. The devices that are not part of the network are not required to obey the node/meter timing requirements, and therefore may attempt to transmit a message in a timeslot reserved for a meter to node response. Meters will rely on the collision avoidance mechanism provided by the CEBUS MAC layer, and will attempt one immediate retry if the channel is busy and can not be accessed. After the one retry, the meter will cancel the message, and the node is required to reissue the command.

After a meter receives the node message and is waiting to transmit the response, it will use a Link layer filter to prevent other packets (responses to the node from other meters, etc.) from being passed to the meter application. This prevents the meter application from continually reading and processing received messages while waiting to transmit a response.

2.2.1 Repeater Support

As discussed earlier, the Source Address field is preferably used for repeater addresses (for a detailed understanding of the repeater algorithms, refer to U.S. patent application Ser. No. 08/870,640, filed Jun. 6, 1997, entitled "RF Repeater for Automatic Meter Reading System"; see also U.S. patent application Ser. No. 08/908,728, filed Aug. 7, 1997, entitled "Energy Meter with Multiple Protocols for Communication with Local and Wide Area Networks") to either implement RF communications that read meters directly, with single repeats or with dual repeats. The timing mechanisms discussed above are applicable to repeated reads of unique or groups of meters.

2.3 Authentication

One of the negative aspects of using a standard protocol and available RF environment for communications is the potential for individuals to tamper with meter data. One method of accomplishing this tampering is by monitoring the RF channel and recording messages for transmittal at a later date. As an example, a download command to a meter that sets the meter to base rate could be recorded and used when the meter is supposed to be recording data at peak rate. To prevent this from happening while at the same time not preventing the node from accessing meters at any time, an encrypted password algorithm may be used at the meter and at the node. The encryption algorithm would preferably be time dependent such that the encryption key would be changed frequently. As long as the node follows the same sequence as the meters, the encryption key would be known by both ends of the communication network. Time synch messages from the node will insure that both ends of the system maintain the correct sequence.

One possible implementation involves encrypting the current time with a known encryption key and a user defined password. The 4 byte password field allows for encryption of date and time (MM DD hh mm). When the meter receives the message, if the decrypted authentication/password field contains a time within +/−10 minutes from the meter's time, the message is preferably accepted and processed by the meter.

When a meter loses time due to a power outage, received messages will fail the password/authentication check and the meter will transmit a Security Clearance NAK response to the node. The NAK will trigger the node to send a time synch command to the meter. The node will use a secondary password scheme (a default password) to authenticate to the meter that the time message is valid. The meter will only accept the secondary password for time synchronization messages. The secondary password is not as secure as the main authentication/password scheme, and it's use will therefore be limited. Once the meter time has been set, the node can retry the meter command using the primary password/authentication scheme.

3. Examples of CEBUS fixed network messages 3.1 Uniquely read complete table from one meter; response fits in one packet Table ID=$0805, response table data length=8 bytes. Meter unique address=1050.

Data collector (node) address=10

Command:

| Ctrl | DA | DHC | SA | SHC | NPDU header | APDU header | CAL Overhead | | | | | User defined header | | | | | C12.18 appl layer cmd | | | Cks |
|------|------|------|------|-----|-------------|-------------|--------------|----|----|----|----|---------------------|----|----|----|----|----------------------|----|----|-----|
| 02 | null | null | null | 10 00 | 50 | B4 A8 yy yy yy yy | 50 F4 | 31 | 30 | F6 | 04 | 00 1A | 00 | 00 | 00 | 00 | 30 | 08 | 05 | xx |

Response:

| Ctrl | DA | DHC | SA | SHC | NPDU header | APDU header | CAL Overhead | | | | User defined header | | | | | C12.18 appl layer cmd | | | | | Cks |
|------|------|------|------|-----|-------------|-------------|--------------|----|----|----|---------------------|----|----|----|----|----------------------|----|----|----|----|-----|
| 02 | null | null | null | 10 00 | 50 | E0 | 50 F4 | 31 | 37 | F6 | 00 00 | 00 | 04 | 1A | | 00 01 06 | 00 02 07 | 08 03 08 | 04 cc | 05 | xx |

3.2 Uniquely read partial table from one meter; response fits in two packet

Table ID=$0804, table offset=10, table data length=48 bytes. Meter unique address=1050. Data collector (node) address=10

Command:

| Ctrl | DA | DHC | SA | SHC | NPDU header | APDU header | CAL Overhead | | | | | User defined header | | | | C12.18 appl layer cmd | | | Cks |
|------|------|------|------|-----|-------------|-------------|--------------|----|----|----|----|---------------------|----|----|----|----------------------|----|----|-----|
| 02 | null | null | null | 10 00 | 50 | B4 xx yy yy yy yy | 50 F4 | 31 | 34 | F6 | 00 | 00 | 00 | 04 | 1A | 3F 00 00 | 08 00 00 | 05 0A 30 | xx |

Response Packet #1:

| Ctrl | DA | DHC | SA | SHC | NPDU header | APDU header | CAL Overhead | | | | User defined header | | | | C12.18 appl layer resp | | | Cks |
|---|---|---|---|---|---|---|---|---|---|---|---|---|---|---|---|---|---|---|
| 02 | null | null | null | 10 | 00 58 01 | C3 | E0 | 50 F4 | 35 | 35 | F6 | 00 00 | 00 | 04 | 1A | 00 00 30 <15 bytes TBL data> | | | xx |

Response Packet #2:

| Ctrl | DA | DHC | SA | SHC | NPDU header | User defined header | | | | | C12.18 appl layer resp | Cks |
|---|---|---|---|---|---|---|---|---|---|---|---|---|
| 02 | null | null | null | 10 00 | 48 00 | C3 | 00 | 00 00 | 04 | 1A | <23 bytes TBL data> | xx |

4. Data thru-put

The Information field in a CEBUS packet is limited to 32 bytes. The number of bytes in the information field available for application information is summarized for the different types of packets.

| Commands (Node->meter) | |
|---|---|
| NPDU header | 1 |
| APDU header | 6 |
| CAL overhead | 5 |
| User overhead (rpt/addr info) | 5 |
| C12.18 application layer | 15 |

| Responses (Meter->node) | | |
|---|---|---|
| | 1st/only packet | non-1st packet(s) |
| NPDU header | 3 | 3 |
| APDU header | 1 | 0 |
| CAL overhead | 5 | 0 |
| User overhead (address info) | 5 | 5 |
| C12.18 application layer | 18 | 24 |
| Table data | 14 | 24 |

The largest node -> meter command is an 8 byte partial read, so the command will always fit in one packet. In addition to table data, a C12.18 response contains a one byte ACK code, a 2 byte length field, and a one byte checksum, thereby limiting the table data to 14 bytes in the first or only packet of a response.

The following information is used to estimate the data thru-put for the fixed network system:

1. CEBUS effective bit rate 5 kbps;
2. 10 USTs between the node -> meter command and the first meter response;
3. 1 Link layer retry for each meter packet;
4. 10 USTs between meter responses;
5. calculations do not account for leading zero suppression in CEBUS address fields; and
6. the total packet size is 1+8+32+1=42 bytes.

Assuming each meter is to respond with 18 bytes of C12.18 data (one packet), the time required to read 500 meters is:

| Node->meter packet | (42*8)b/5 kbps | 67 msec |
|---|---|---|
| 1 meter response with retry. (retry delay = 10 USTs) | (100 usec * 10) + (67 msec*2) + (100 usec * 10) | 136 msec |
| 500 meters | 500 * 136 msec | 68 sec |
| Total time to read 1 packet from 512 meters: | | approx. 70 sec |

Assuming a cell reuse factor of 20 (1 of 20 node cells can talk at a time) and 500 meters per node, an estimate of the time to read 1 million meters is:

20*70 sec=1400 sec=24 minutes
1 million meters * 1 node/500 meters=2000 nodes
2000 nodes /20=100 node cells communicate at one time In sum, the present invention offers numerous benefits and advantages vis-a-vis the prior art, including:

1. The disclosed invention may be applied to a fixed network RF AMR system that utilizes the CEBUS protocols in a manner to maintain compliance with other products that could be used for residential automation functions.
2. The invention may be applied to a CEBUS compliant RF system that can be used for reading water, gas or electric meters.
3. The invention may be applied to an AMR system that complies with the CEBUS standard but provides a secure method of data collection based on time varying encryption algorithms.
4. The invention may be applied to a CEBUS compliant, fixed network RF AMR system with group read/write capability, dual repeater linkages, outage notification and home automation links.
5. The invention may be applied to a solid state electric meter with an integral CEBUS RF transceiver that operates as an end device and/or a repeater in a fixed network AMR system that is compliant with standard CEBUS RF products.
6. The invention may be applied to a solid state electric meter with one integral CEBUS RF transceiver that supports both AMR and home automation communication requirements.

While the present invention has been described and illustrated with reference to specific, presently preferred embodiments, those skilled in the art will recognize that modifications to the preferred embodiments may be made without departing from the principles of the invention as described above and set forth in the following claims. For example, except as they may be explicitly so limited, the claims are not restricted to embodiments of the invention in which the CEBus protocol is used. For example, the (LonTalk)-Talk protocol with RF may be employed. Other features of the preferred embodiments described above may be modified without substantially departing from the teachings set forth herein.

We claim:

1. An automatic meter reading (AMR) system, comprising:
   (a) a plurality of utility meters, each said meter comprising a radio frequency (RF) module for transmitting and receiving RF CEBUS message packets in accordance with a prescribed CEBUS protocol, wherein said CEBUS message packets contain embedded AMR message packets in accordance with a prescribed AMR protocol; and
   (b) a node for accessing data stored by any one or a group of said utility meters via RF communications using said CEBUS protocol;
   wherein the CEBUS message packets include a plurality of fields, a selected one of said fields having a first prescribed format for messages from the node to the meters and a second prescribed format for messages from the meters to the node.

2. An AMR system as recited in claim 1, wherein the CEBUS message packets provide fields for addressing individual meters and groups of meters, for performing multi-level repeater functions, and for performing authentication/password control.

3. An AMR system as recited in claim 2, wherein the CEBUS protocol comprises a Source Device Address field and an Information field that includes a Network Layer Header (NPDU), an Application Layer Header (APDU), and a Common Application Language (CAL) message; and wherein repeater information is embedded in said Source Device Address field, authentication/password information is embedded in said Application Layer Header, and group addressing information is embedded in said Common Application Language message.

4. An AMR system as recited in claim 3, wherein said CAL message includes a user defined header portion having a format including a Group Response Select field, an Address Mask field, and an Address field.

5. An AMR system as recited in claim 4, wherein said CAL message format consists essentially of bit fields having the following configuration:

| Group Response Select | Address Mask | Address Field |
|---|---|---|
| 4 bits | 4 bits | 32 bits |

6. An AMR system as recited in claim 4, wherein each meter has a unique address and said node is capable of reading data of individual meters using the individual meters' unique address.

7. An AMR system as recited in claim 6, wherein said node is capable of reading data of a selected group of meters with a single command.

8. An AMR system as recited in claim 7, wherein said Address Mask is used to convey information between the node and the meters.

9. An AMR system as recited in claim 8, wherein the Address Mask field has a first prescribed format for messages from the node to the meters and the second prescribed format for messages from the meters to the node.

10. An AMR system as recited in claim 9, wherein, for messages sent from the node to a meter(s), the Address Mask field identifies the type of address held in the Address field.

11. An AMR system as recited in claim 10, wherein, when the Address Mask equals zero, the Address field contains a unique address; and when the Address Mask field is non-zero, the Address field is divided into a prescribed number of group addresses and each of the bits in the Address Mask field are used to indicate the presence or absence of a specific group address.

12. An AMR system as recited in claim 11, wherein, if an address select bit in the Address Mask field is set (=1), the meter will respond only if a corresponding address in the Address field matches the meter's address.

13. An AMR system as recited in claim 12, wherein, for group addressing, the format of the Address Mask and Address fields comprises bit fields having the following format:

| Address Mask Field | | | | Address Field | | | |
|---|---|---|---|---|---|---|---|
| Utility Select | Section Select | Class Select | Division Select | Utility Address | Section Address | Class Address | Division Address |
| 1 bit | 1 bit | 1 bit | 1 bit | 12 bits | 4 bits | 8 bits | 8 bits |

14. An AMR system as recited in claim 13, each response message from a meter contains the meter's unique address, and the Address Mask field is defined differently for meter response messages.

15. An AMR system as recited in claim 14, wherein, for meter response messages, the bits of the Address Mask field are used by meters functioning as repeaters to indicate message transfer failure.

16. An AMR system as recited in claim 15, wherein, for meter response messages, the Address Mask field is defined as:

| Address Mask in response message | Definition |
| --- | --- |
| 0 | No errors, successful message |
| 1 | 1st level repeater did not receive response from repeater or end meter |
| 2 | 2nd level repeater did not receive response from end meter |
| 3–15 | undefined |

17. An AMR system as recited in claim 4, wherein, for group response messages the node is capable of eliciting individual responses from a selected group of meters by broadcasting a single command.

18. An AMR system as recited in claim 17, wherein, after broadcasting a message, the node sets a timer and waits for meter responses before it broadcasts another message; and each meter is assigned a unique window of time during which it is allowed to broadcast a response to the node.

19. An AMR system as recited in claim 18, wherein said window of time comprises two configurable parameters, including a timeslot parameter and a window size parameter; and wherein no two meters responding to a message from the node are configured with the same timeslot but all meters responding to said message are configured with the same window size.

20. An AMR system as recited in claim 19, wherein said Group Response Select field allows the node to select one of a prescribed number of meter timeslots for the group response.

21. An AMR system as recited in claim 20, wherein each meter has an associated application and, after a given meter receives a node message and is waiting to transmit its response, the said given meter uses a Link layer filter to prevent responses to the node from other meters from being passed to the given meter's application, whereby the given meter's application is prevented from continually reading and processing received messages while waiting to transmit a response.

22. An AMR system as recited in claim 4, the Source Address field is used for repeater addresses to either implement RF communications that read meters directly, with single repeats or with dual repeats.

23. An AMR system as recited in claim 4, wherein, to prevent unauthorized access to said meters, an encrypted password algorithm is used at the meter and at the node.

24. An AMR system as recited in claim 23, said encryption algorithm is time dependent such that an encryption key employed by the algorithm is changed periodically.

25. An AMR system as recited in claim 24, wherein the node follows the same encryption algorithm as the meters such that the encryption key is known by both the node and the meters, and time synch messages from the node are used to ensure that both the node and the meters maintain the correct sequence in changing the encryption key.

26. A method for operating automatic meter reading (AMR) system, including a plurality of utility meters and a node for accessing data stored by any one or a group of said utility meters via RF communications using said CEBUS protocol, each said meter comprising a radio frequency (RF) module for transmitting and receiving RF CEBUS message packets in accordance with the prescribed CEBUS protocol, wherein said CEBUS message packets contain embedded AMR message packets in accordance with a prescribed AMR protocol, said method comprising:

defining fields in CEBUS message packets so as to provide fields for addressing individual meters and groups of meters, wherein a selected one of said fields is defined as having a first prescribed format for messages from the node to the meters and a second prescribed format for messages from the meters to the node.

27. A method as recited in claim 26, further comprising defining fields in said CEBUS message packets for performing multi-level repeater functions and for performing authentication/password control.

28. A method as recited in claim 26, wherein the CEBUS protocol comprises a Source Device Address field and an Information field that includes a Network Layer Header (NPDU), an Application Layer Header (APDU), and a Common Application Language (CAL) message; and wherein repeater information is embedded in said Source Device Address field, authentication/password information is embedded in said Application Layer Header, and group addressing information is embedded in said Common Application Language message.

29. A method as recited in claim 28, wherein said CAL message includes a user defined header portion having a format including a Group Response Select field, an Address Mask field, and an Address field.

30. A method as recited in claim 29, wherein a CAL message user defined header format consists essentially of bit fields having the following configuration:

| Group Response Select | Address Mask | Address Field |
| --- | --- | --- |
| 4 bits | 4 bits | 32 bits |

31. A method as recited in claim 29, wherein each meter has a unique address and said node is capable of reading data of individual meters using the individual meters' unique address.

32. A method as recited in claim 31, wherein said node is capable of reading data of a selected group of meters with a single command.

33. A method as recited in claim 32, wherein said Address Mask is used to convey information between the node and the meters.

34. A method as recited in claim 33, wherein the Address Mask field has the first prescribed format for messages from the node to the meters and the second prescribed format for messages from the meters to the node.

35. A method as recited in claim 34, wherein, for messages sent from the node to a meter(s), the Address Mask field identifies the type of address held in the Address field.

36. A method as recited in claim 35, wherein, when the Address Mask equals zero, the Address field contains a unique address; and when the Address Mask field is non-zero, the Address field is divided into a prescribed number of group addresses and each of the bits in the Address Mask field are used to indicate the presence or absence of a specific group address.

37. A method as recited in claim 36, wherein, if an address select bit in the Address Mask field is set (=1), the meter will respond only if a corresponding address in the Address field matches the meter's address.

38. A method as recited in claim 37, wherein, for group addressing, the format of the Address Mask and Address fields comprises bit fields having the following format:

| Address Mask Field | | | | Address Field | | | |
|---|---|---|---|---|---|---|---|
| Utility Select | Section Select | Class Select | Division Select | Utility Address | Section Address | Class Address | Division Address |
| 1 bit | 1 bit | 1 bit | 1 bit | 12 bits | 4 bits | 8 bits | 8 bits |

39. A method as recited in claim 38, each response message from a meter contains the meter's unique address, and the Address Mask field is defined differently for meter response messages.

40. A method as recited in claim 39, wherein, for meter response messages, the bits of the Address Mask field are used by meters functioning as repeaters to indicate message transfer failure.

41. A method as recited in claim 40, wherein, for meter response messages, the Address Mask field is defined as:

| Address Mask in response message | Definition |
|---|---|
| 0 | No errors, successful message |
| 1 | 1st level repeater did not receive response from repeater or end meter |
| 2 | 2nd level repeater did not receive response from end meter |
| 3–15 | undefined |

42. A method as recited in claim 29, wherein, for group response messages, the node is capable of eliciting individual responses from a selected group of meters by broadcasting a single command.

43. A method as recited in claim 42, wherein, after broadcasting a message, the node sets a timer and waits for meter responses before it broadcasts another message; and each meter is assigned a unique window of time during which it is allowed to broadcast a response to the node.

44. A method as recited in claim 43, wherein said window of time comprises two configurable parameters, including a timeslot parameter and a window size parameter; and wherein no two meters responding to a message from the node are configured with the same timeslot but all meters responding to said message are configured with the same window size.

45. A method as recited in claim 44, wherein said Group Response Select field allows the node to select one of a prescribed number of meter timeslots for the group response.

46. A method as recited in claim 45, wherein each meter has an associated application and, after a given meter receives a node message and is waiting to transmit its response, the said given meter uses a Link layer filter to prevent responses to the node from other meters from being passed to the given meter's application, whereby the given meter's application is prevented from continually reading and processing received messages while waiting to transmit a response.

47. A method as recited in claim 29, the Source Address field is used for repeater addresses to either implement RF communications that read meters directly, with single repeats or with dual repeats.

48. A method as recited in claim 29, wherein, to prevent unauthorized access to said meters, an encrypted password algorithm is used at the meter and at the node.

49. A method as recited in claim 48, said encryption algorithm is time dependent such that an encryption key employed by the algorithm is changed periodically.

50. A method as recited in claim 49, wherein the node follows the same encryption algorithm as the meters such that the encryption key is known by both the node and the meters, and time synch messages from the node are used to ensure that both the node and the meter maintain the correct sequence in changing the encryption key.

* * * * *